(12) United States Patent
Kitagawa

(10) Patent No.: US 8,040,090 B2
(45) Date of Patent: Oct. 18, 2011

(54) BRUSHLESS MOTOR CONTROLLER AND BRUSHLESS MOTOR

(75) Inventor: Takayuji Kitagawa, Toyohashi (JP)

(73) Assignee: ASMO Co., Ltd, Shizuoka-ken (JP)

( * ) Notice: Subject to any disclaimer, the term of this patent is extended or adjusted under 35 U.S.C. 154(b) by 406 days.

(21) Appl. No.: 12/429,705

(22) Filed: Apr. 24, 2009

(65) Prior Publication Data

US 2009/0267549 A1    Oct. 29, 2009

(30) Foreign Application Priority Data

Apr. 24, 2008  (JP) ................... 2008-113892

(51) Int. Cl.
  *H02P 23/12* (2006.01)
  *H02P 21/00* (2006.01)
  *H02P 6/14* (2006.01)
(52) U.S. Cl. .............. 318/400.14; 318/400.02; 318/812; 318/729; 318/400.01
(58) Field of Classification Search .................. 318/400, 318/400.14
  See application file for complete search history.

(56) References Cited

U.S. PATENT DOCUMENTS

| | | | | |
|---|---|---|---|---|
| 5,583,404 | A * | 12/1996 | Karwath et al. | 318/400.14 |
| 6,002,234 | A * | 12/1999 | Ohm et al. | 318/729 |
| 2002/0030463 | A1 * | 3/2002 | Sunaga et al. | 318/727 |
| 2008/0201041 | A1 * | 8/2008 | Jiang | 701/42 |
| 2008/0252242 | A1 * | 10/2008 | Akama et al. | 318/400.14 |
| 2008/0292292 | A1 * | 11/2008 | Ni et al. | 388/812 |

FOREIGN PATENT DOCUMENTS

| | | |
|---|---|---|
| JP | 7184384 A | 7/1995 |
| JP | 2002-315381 A | 10/2002 |

* cited by examiner

*Primary Examiner* — Bentsu Ro
*Assistant Examiner* — Jorge Carrasquillo
(74) *Attorney, Agent, or Firm* — Sheridan Ross P.C.

(57) ABSTRACT

A brushless motor controller that controls a brushless motor by determining an energizing timing of a three-phase stator coil based on the rotational position and speed of a rotor. The controller includes a normal timing generation unit, an advancing timing generation unit, and a control switching unit. The normal timing generation unit generates a normal energizing timing. The advancing angle timing generation unit generates an advancing angle energizing timing advanced by a predetermined amount from the normal energizing timing and a final advancing angle energizing timing delayed by a delay amount from the advancing angle energizing timing. The control switching unit switches rotation control of the motor between a first rotation control executed in accordance with the normal energizing timing and a second rotation control executed in accordance with the final advancing angle energizing timing.

6 Claims, 8 Drawing Sheets

| Electrical Angle | Hall Element | | | FET | | | | | |
|---|---|---|---|---|---|---|---|---|---|
| | | | | U | | V | | W | |
| | Hu | Hv | Hw | 1u | 2u | 1v | 2v | 1w | 2w |
| 0-60 | 1 | 1 | 0 | 0 | 1 | 1 | 0 | 0 | 0 |
| 60-120 | 1 | 0 | 0 | 0 | 1 | 0 | 0 | 1 | 0 |
| 120-180 | 1 | 0 | 1 | 0 | 0 | 0 | 1 | 1 | 0 |
| 180-240 | 0 | 0 | 1 | 1 | 0 | 0 | 1 | 0 | 0 |
| 240-300 | 0 | 1 | 1 | 1 | 0 | 0 | 0 | 0 | 1 |
| 300-360 | 0 | 1 | 0 | 0 | 0 | 1 | 0 | 0 | 1 |

| Electrical Angle | Hall Element | | | FET (120° Advancing) | | | | | |
|---|---|---|---|---|---|---|---|---|---|
| | | | | U | | V | | W | |
| | Hu | Hv | Hw | 1u | 2u | 1v | 2v | 1w | 2w |
| 0-60 | 1 | 1 | 0 | 0 | 0 | 0 | 1 | 1 | 0 |
| 60-120 | 1 | 0 | 0 | 1 | 0 | 0 | 1 | 0 | 0 |
| 120-180 | 1 | 0 | 1 | 1 | 0 | 0 | 0 | 0 | 1 |
| 180-240 | 0 | 0 | 1 | 0 | 0 | 1 | 0 | 0 | 1 |
| 240-300 | 0 | 1 | 1 | 0 | 1 | 1 | 0 | 0 | 0 |
| 300-360 | 0 | 1 | 0 | 0 | 1 | 0 | 0 | 1 | 0 |

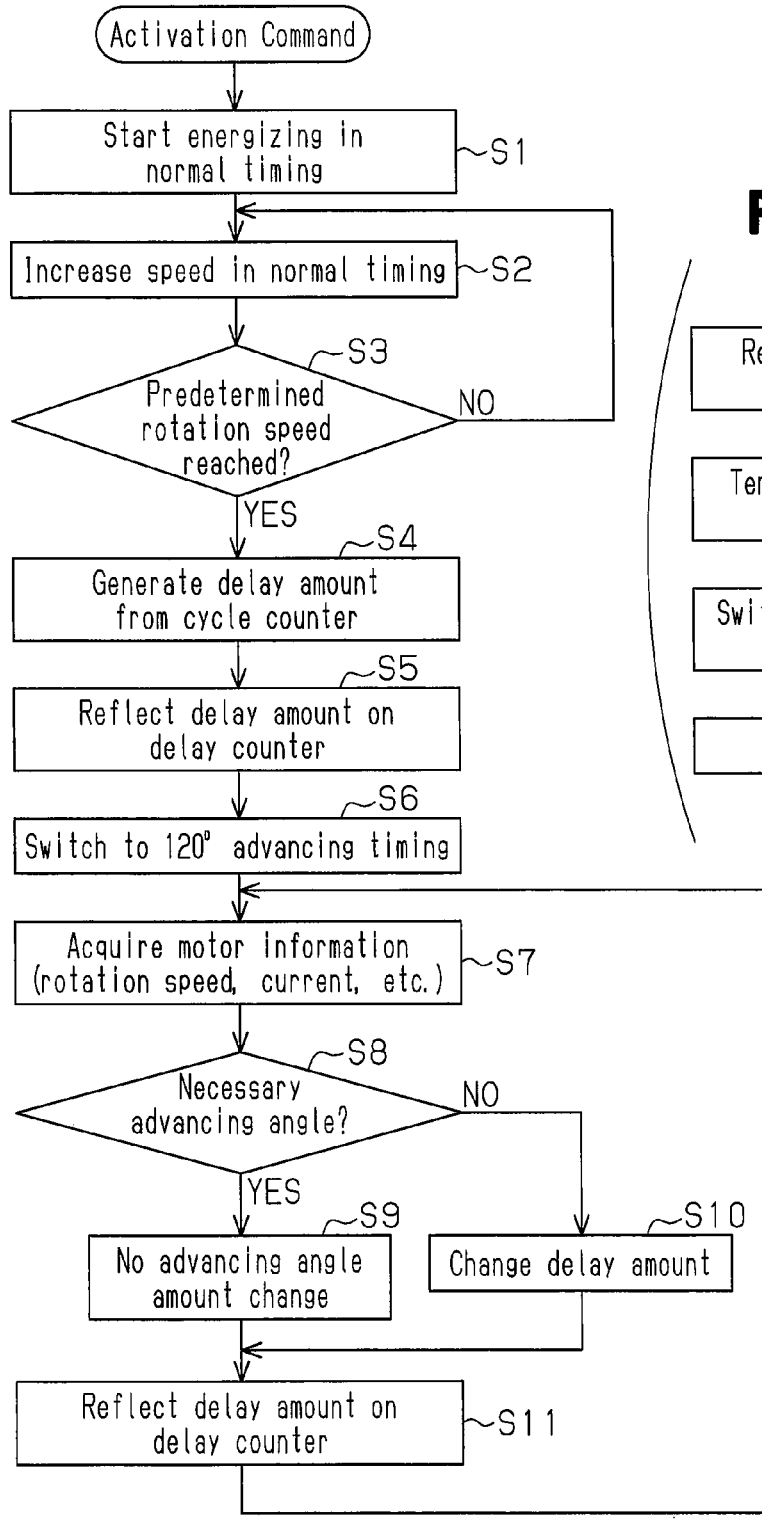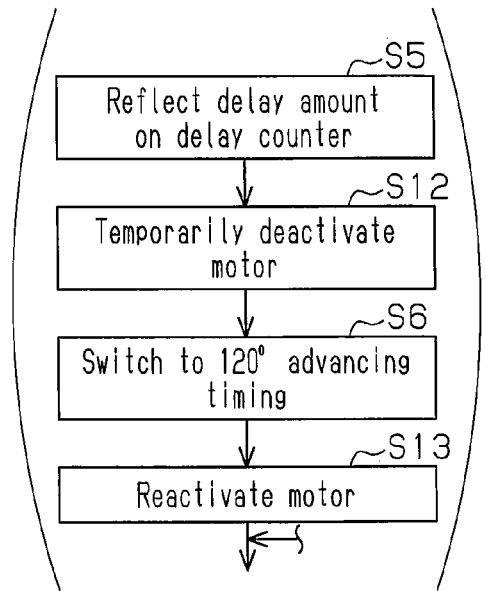

| Electrical Angle | Hall Element (Inverting) | | | FET | | | | | |
|---|---|---|---|---|---|---|---|---|---|
| | | | | U | | V | | W | |
| | Hu | Hv | Hw | 1u | 2u | 1v | 2v | 1w | 2w |
| 0-60 | 0 | 0 | 1 | 1 | 0 | 0 | 1 | 0 | 0 |
| 60-120 | 0 | 1 | 1 | 1 | 0 | 0 | 0 | 0 | 1 |
| 120-180 | 0 | 1 | 0 | 0 | 0 | 1 | 0 | 0 | 1 |
| 180-240 | 1 | 1 | 0 | 0 | 1 | 1 | 0 | 0 | 0 |
| 240-300 | 1 | 0 | 0 | 0 | 1 | 0 | 0 | 1 | 0 |
| 300-360 | 1 | 0 | 1 | 0 | 0 | 0 | 1 | 1 | 0 |

BRUSHLESS MOTOR CONTROLLER AND BRUSHLESS MOTOR

CROSS-REFERENCE TO RELATED APPLICATION

The present application claims the benefit of Japanese Patent Application No. 2008-113892 filed Apr. 24, 2008, which is incorporated herein by this reference in its entirety.

FIELD OF THE INVENTION

Embodiments of the present invention are generally related to a brushless motor controller that controls a brushless motor by determining an energizing timing of a three-phase stator coil based on the rotational position and speed of a rotor.

BACKGROUND OF THE INVENTION

The present invention relates to a brushless motor controller and a brushless motor which are suitable for stabilizing rotational drive, in particular, during rotational driving in a low-speed rotation state immediately after activation.

In a brushless motor, the rotational position of a rotor is detected by a rotation sensor, and the energizing timing of a stator coil is set based on the detected rotational position to control rotation produced by the motor. Japanese Laid-Open Patent Publication No. 2002-315381 and Japanese Patent No. 3420317 describe examples of such a brushless motor.

During rotational driving of a motor, when the drive current increases as the rotation speed of the motor increases, the energizing timing is delayed due to influence of an armature reaction. Therefore, in order to offset the delay, a so-called angle advancing control may be employed. The angle advancing control sets a rotation sensor at an advancing angle side beforehand to advance the energizing timing, or controls the motor at an advancing angle energizing timing that is advanced from a normal energizing timing and set beforehand as described in Japanese Laid-Open Patent Publication No. 2002-315381.

In the angle advancing control, the energizing timing is over-advanced when the rotation speed of a motor is low. For this reason, the advancing angle energizing timing is delayed toward the normal energizing timing. At this time, a count value corresponding to the rotation speed is set by a delay counter, and the energizing timing is delayed based on the count value of the delay counter.

However, during a period immediately after activation in which the speed of the motor is extremely low, it is desirable that the energizing be performed at the normal energizing timing. Thus, the count value, which increases as the rotation speed of the motor decreases, becomes an extremely large value during the low-speed period. However, the count value of the delay counter is finite. Thus, the count value overflows during the period immediately after activation in which the speed of the motor is extremely low. As a result, the energizing timing is not correctly delayed, and the energizing timing remains deviated from the desirable timing. During the period immediately after activation of the motor in which the speed is extremely low, this lowers the motor efficiency and increases noise and vibration.

In Japanese Patent No. 3420317, angle advancing control which uses the advancing angle energizing timing is not performed, and the optimum energizing timing for the present state is calculated from pulse edges of detection signals output from a rotation sensor to control a motor. Thus, the problems described above to not occur during the period immediately after activation in which the speed of the motor is extremely low. However, complicated computations must be performed for every one of the rotation speed ranges. This results in the need for CPU that performs such complicated computations with a controller and increases the cost of the controller.

SUMMARY OF THE INVENTION

It is an object of the present invention to provide a brushless motor controller and a brushless motor which stabilize rotation with a simple control, in particular, stabilize rotation in a low-speed rotation state immediately after activation.

To achieve the above object, one aspect of the present invention provides a brushless motor controller that performs rotation control for a brushless motor by detecting a rotational position and a rotation speed of a rotor based on a detection signal from a rotation sensor and determining an energizing timing of a three-phase stator coil based on the detected rotational position and rotation speed of the rotor. The brushless motor controller includes a normal timing generation unit which generates a normal energizing timing determined by the rotational position of the rotor. An advancing angle timing generation unit generates an advancing angle energizing timing determined by the rotational position of the rotor and advanced by a predetermined amount from the normal energizing timing, generates a delay amount that changes in correspondence with the rotation speed of the rotor, and generates a final advancing angle energizing timing delayed by the delay amount from the advancing angle energizing timing. A control switching unit switches rotation control of the motor between a first rotation control executed when the rotation speed of the rotor is less than a predetermined value and a second rotation control executed when the rotation speed of the rotor is greater than or equal to the predetermined value. The motor is controlled in accordance with the normal energizing timing in the first rotation control, and the motor is controlled in accordance with the final advancing angle energizing timing in the second rotation control.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 10A is a flowchart illustrating rotation control in the preferred embodiment;

FIG. 10B is a flowchart illustrating rotation control in a further example;

DETAILED DESCRIPTION OF THE PREFERRED EMBODIMENTS

A preferred embodiment of the present invention will be described with reference to the drawings.

Figure 1:
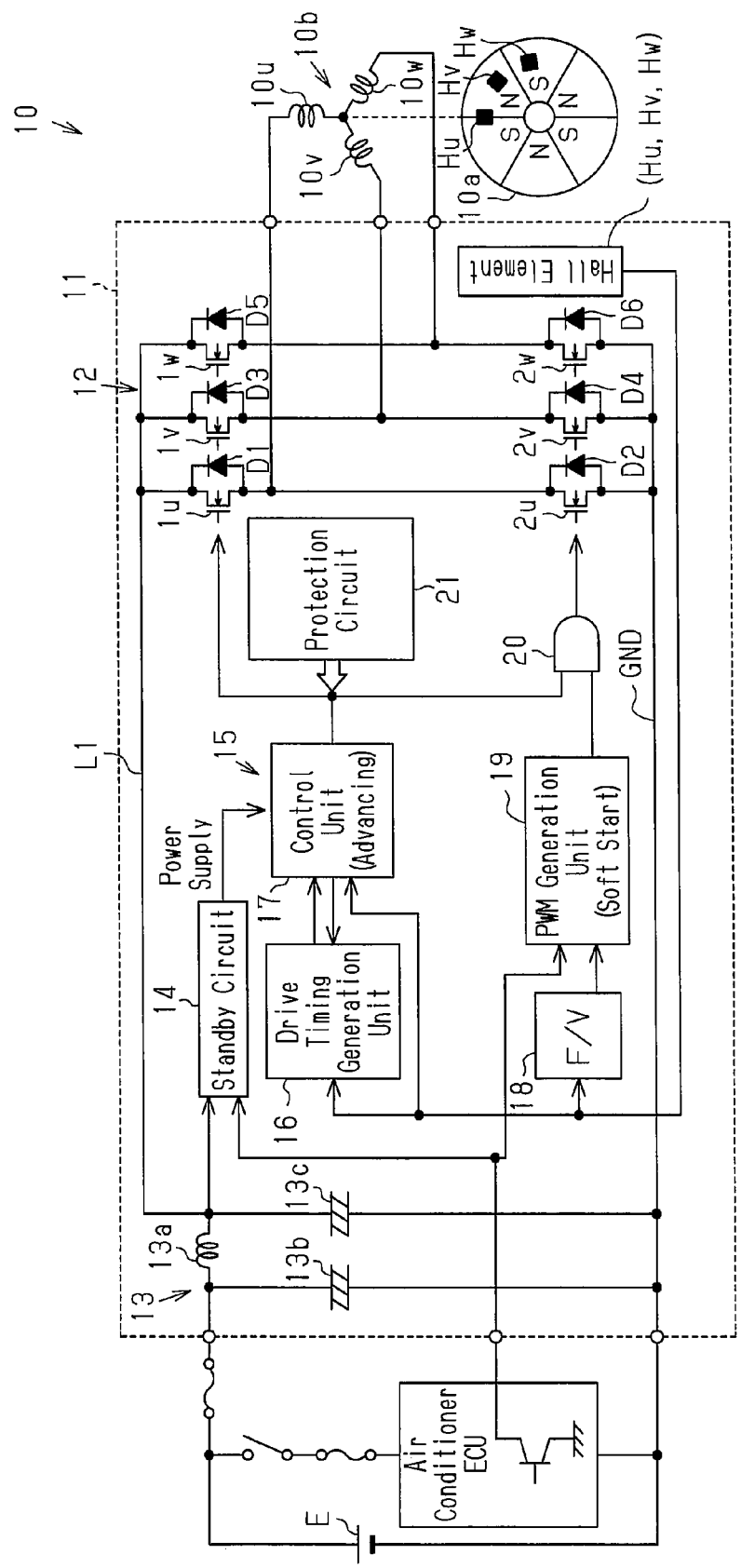
FIG. 1 is a schematic block diagram of a brushless motor and a controller according to a preferred embodiment of the invention.

FIG. 1 shows a brushless motor 10, which is used as a blower motor for a vehicle air conditioner. The brushless motor 10 is rotationally driven such that drive power is supplied for three phases, namely, the U phase, V phase, and W phase. A controller 11 sets energizing timings for the three phases and generates drive power for each of the phases to control rotation of the brushless motor 10. The controller 11 is integrally arranged on the brushless motor 10.

The controller 11 includes a three-phase inverter circuit 12 to generate drive power for three phases, the phases of which differ from the phase of the DC power supplied from a DC power supply E by 120° with respect to one another. The three-phase inverter circuit 12 includes a bridge circuit using six switching element FETs 1u, 2u, 1v, 2v, 1w, and 2w. Between a high-potential-side power supply line L1 and a ground line GND, the FET 1u and the FET 2u for the U phase are connected in series, the FET 1v and the FET 2v for the V phase are connected in series, and the FET 1w and the FET 2w for the W phase are connected in series. The DC power from the DC power supply E is stabilized by a power supply stabilizing circuit 13, which includes a choke coil 13a and smoothing capacitors 13b and 13c, and supplied to the high-potential-side power supply line L1 and the ground line GND. Diodes D1 to D6, which generate free-wheeling currents, are reversely connected to the FETs 1u, 2u, 1v, 2v, 1w, and 2w, respectively.

The brushless motor 10 includes a 6-pole rotatable rotor 10a having different magnetic poles arranged in angular intervals of 60°. A stator 10b includes U-phase, V-phase, and W-phase stator coils 10u, 10v, and 10w configured by a Y-connection (star connection). An output terminal between the U-phase FETs 1u and 2u is connected to one terminal of the U-phase coil 10u, an output terminal between the V-phase FETs 1v and 2v is connected to one terminal of the V-phase coil 10v, and an output terminal between the W-phase FETs 1w and 2w is connected to one terminal of the W-phase coil 10w. Drive power for the phases generated by switch-controlling the FETs 1u, 2u, 1v, 2v, 1w, and 2w of the inverter circuit 12 at predetermined timings are supplied to coils 10u, 10v, and 10w for the phases.

Figures 2, 3:
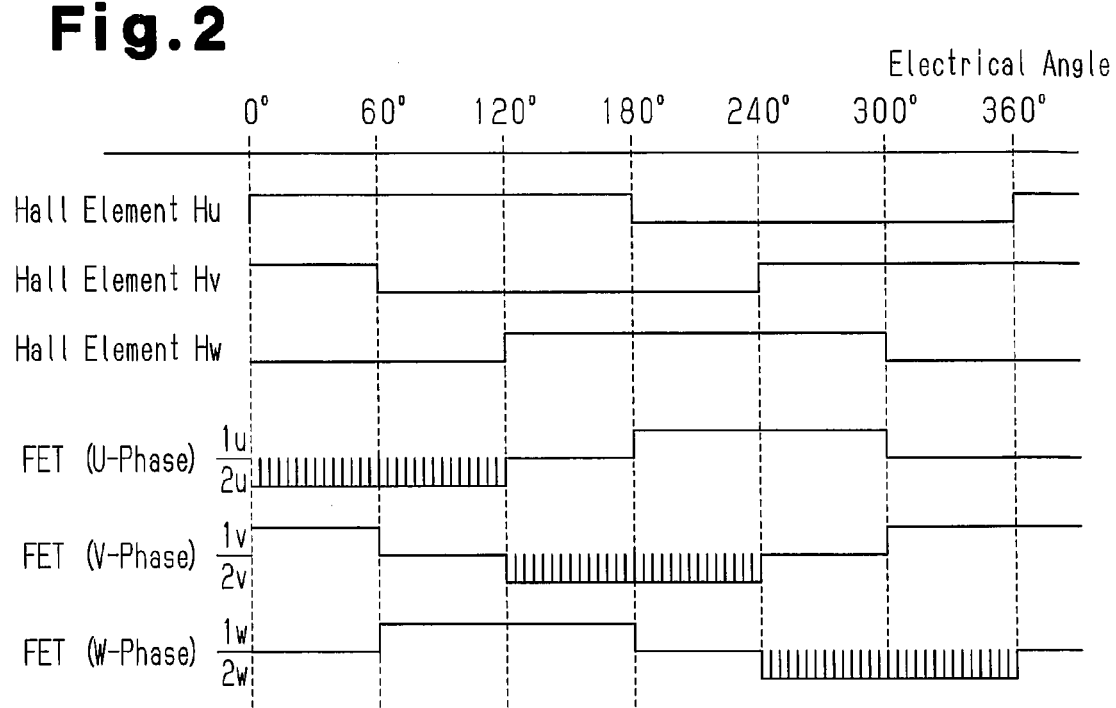
FIG. 2 is a waveform chart showing a drive control signal for a normal energizing timing.
FIG. 3 is a truth table for the normal energizing timing of FIG. 2.
Figure 5:
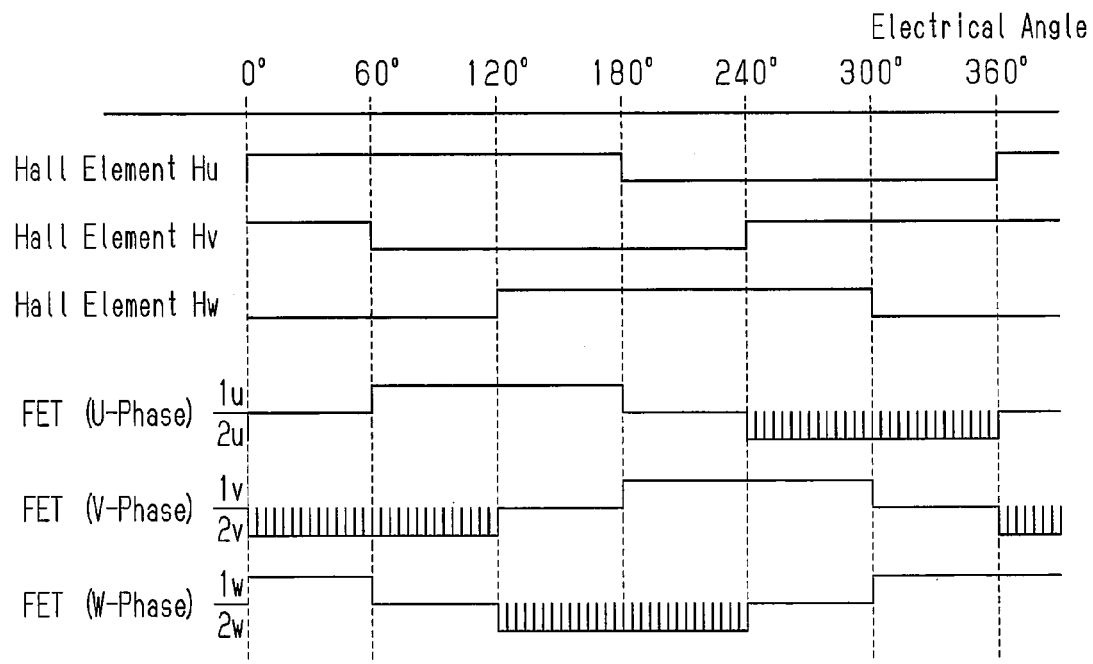
FIG. 5 is a waveform chart showing a drive control signal for a 120° advancing angle energizing timing.

FIGS. 2 and 5 show timings for the switch-control. In the U-phase FETs 1u and 2u, the FET 2u has an OFF period at an electrical angle of 60° subsequent to an ON period of an electrical angle of 120°. Then, the FET 1u repeats the OFF period at an electrical angle of 60° subsequent to the ON period at an electrical angle of 120°. In the V-phase FETs 1v and 2v and the W-phase FETs 1w and 2w, ON and OFF periods are set in the same manner. A phase difference of 120° is set between the phases such that the end of the ON period of the U-phase FET 1u matches with the start of the ON period of the V-phase FET 1v, and the end of the ON period of the V-phase FET 1v matches with the start of the ON period of the W-phase FET 1w. This supplies drive power (not shown in FIG. 2) of the phases having phase differences of 120° to the coils 10u, 10v, and 10w for the phases of the motor 10.

From hall elements Hu, Hv, and Hw serving as a rotation sensor (described later), pulsed detection signals having phase differences of 120° are obtained as the rotor 10a rotates. At a normal energizing timing shown in FIG. 2, the FET 2u is turned on based on a rising edge of the U-phase hall element Hu to an H level, and the FET 1u is turned on based on a falling edge of the hall element Hu to an L level. The FET 2w is turned on based on a rising edge of the V-phase hall element Hv to an H level, and the FET 1w is turned on based on a falling edge of the hall element Hv to an L level. The FET 2v is turned on based on a rising edge of the W-phase hall element Hw to an H level, and the FET 1v is turned on based on a falling edge of the hall element Hw to an L level. A 120° advancing angle energizing timing is advanced by 120° from the normal energizing timing.

Among the FETs 1u, 2u, 1v, 2v, 1w, and 2w, the lower FETs 2u, 2v, and 2w arranged at the side of the ground line GND are PWM-controlled such that the FETs 2u, 2v, and 2w are turned on and off at a higher frequency in an ON period (in FIG. 2, a PWM control period is indicated by vertical stripes). In this manner, the rotation speed of the brushless motor 10 (rotor 10a) is controlled. The switching control of the FETs 1u, 2u, 1v, 2v, 1w, and 2w is performed by a control circuit 15.

As shown in FIG. 1, the control circuit 15 includes a drive timing generation unit 16, a control unit (control switching unit) 17, an F/V converter 18, and a PWM generation unit 19, which are operate based on operational power supplied from a standby circuit 14. The standby circuit 14 generates operational power based on an activation command signal from an air conditioner ECU arranged outside the motor 10 and supplies the operational power to each circuit.

In the brushless motor 10, the three hall elements Hu, Hv, and Hw are arranged at 40° intervals (120° intervals in terms of electrical angle) to detect rotational positions (magnetic pole positions) of the 6-pole rotor 10a for each phase. The hall elements Hu, Hv, and Hw are arranged at a position corresponding to advancing angle of 0°. Detection signals output from the hall elements Hu, Hv, and Hw as the rotor 10a rotates have pulsed shapes having phase differences of 120° with respect to one another (see FIG. 2), and are output to the drive timing generation unit 16, the control unit 17, and the F/V converter 18.

Based on detection signals input from the hall elements Hu, Hv, and Hw, the drive timing generation unit 16 sets the present energizing timings for the coils 10u, 10v, and 10w in each of the phases in correspondence with the rotational positions of the rotor 10a, that is, the drive timings of the FETs 1u, 2u, 1v, 2v, 1w, and 2w. The configuration of the drive timing generation unit 16 will be described in detail later. The control unit 17 operates a cycle counter based on the detection signals from the hall elements Hu, Hv, and Hw and determines the advancing angle amount of the present energizing timing from the rotation speed of the rotor 10a obtained by the cycle counter to control the drive timing generation unit 16. The control unit 17 directly outputs final drive control signals based on the energizing timings generated by the drive timing generation unit 16 to the FETs 1u, 1v, and 1w and outputs the final drive control signals to the FETs 2u, 2v, and 2w through an AND circuit 20.

The F/V converter 18 converts the frequency of the detection signals from the hall elements Hu, Hv, and Hw corresponding to the rotation speed of the rotor 10a into voltage and outputs the converted voltage to the PWM generation unit 19. The PWM generation unit 19 recognizes the rotation speed of the rotor 10a from the converted voltage and outputs a PWM control signal to the AND circuit 20 such that the PWM control signal is added to a drive control signal from the control unit 17. The PWM generation unit 19 gradually increases a duty ratio of the PWM control signal based on an activation command signal from the air conditioner ECU to perform a soft start in which the rotation speed is gradually increased. The PWM generation unit 19, after the soft start, controls the duty ratio of the PWM control signal to so that the rotation speed of the rotor 10a becomes constant at a speed set by a speed command value from a speed command value setting unit (not shown). This changes actual ON times in the ON period of the lower FETs 2u, 2v, and 2w to adjust the drive power supplied to the brushless motor 10 and control the rotation speed of the brushless motor 10.

The control circuit 15 includes a protection circuit 21. The protection circuit 21 forcibly stops the control unit 17 from outputting drive control signals to the FETs 1u, 2u, 1v, 2v, 1w, and 2w to stop the operations of the FETs 1u, 2u, 1v, 2v, 1w, and 2w and the rotation of the brushless motor 10. This protects the brushless motor 10 and the controller 11.

Figure 8:
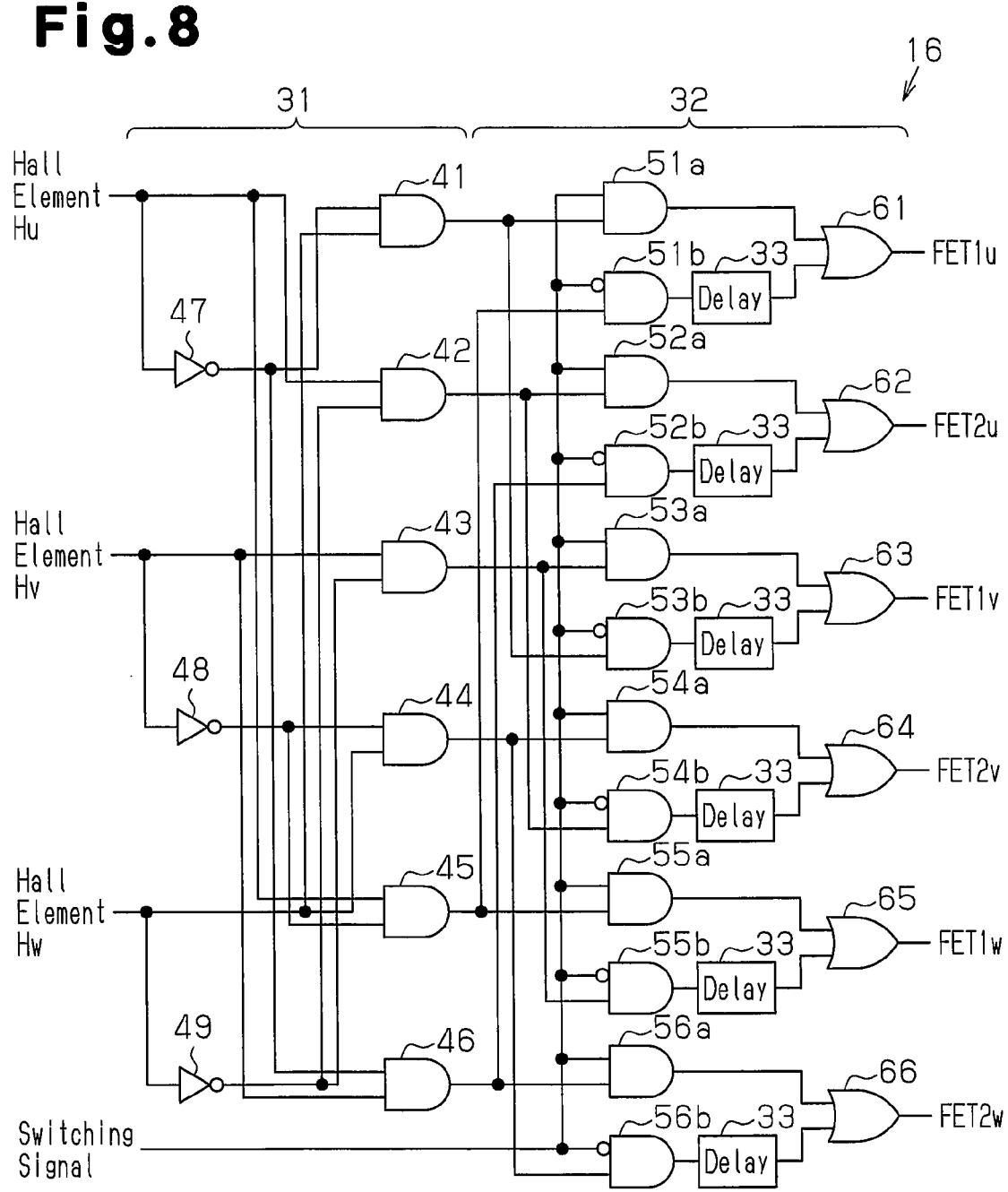
FIG. 8 is a diagram showing a logic gate circuit which generates a normal energizing timing and a 120° advancing angle energizing timing.

The configuration of the drive timing generation unit 16 will now be described in detail, and control executed by the control unit 17 will be discussed. The drive timing generation unit 16, as shown in FIG. 8, includes a basic timing generation unit 31, an output switching unit 32, and a delay circuit 33. The basic timing generation unit 31 is formed by a logic gate circuit. The drive timing generation unit 16 is configured so as to enable generation of an energizing timing, the advancing angle amount of which is variable from 0° to 120°, based on the detection signals output from the hall elements Hu, Hv, and Hw. In the brushless motor 10, the maximum value for the necessary advancing angle amount is set to, for example, 80° due to influence of an armature reaction or the like caused by the configuration of the brushless motor 10. The drive timing generation unit 16 generates an energizing timing that is adjusted to be delayed by a delay count operation from the 120° advancing angle energizing timing.

Figure 4:
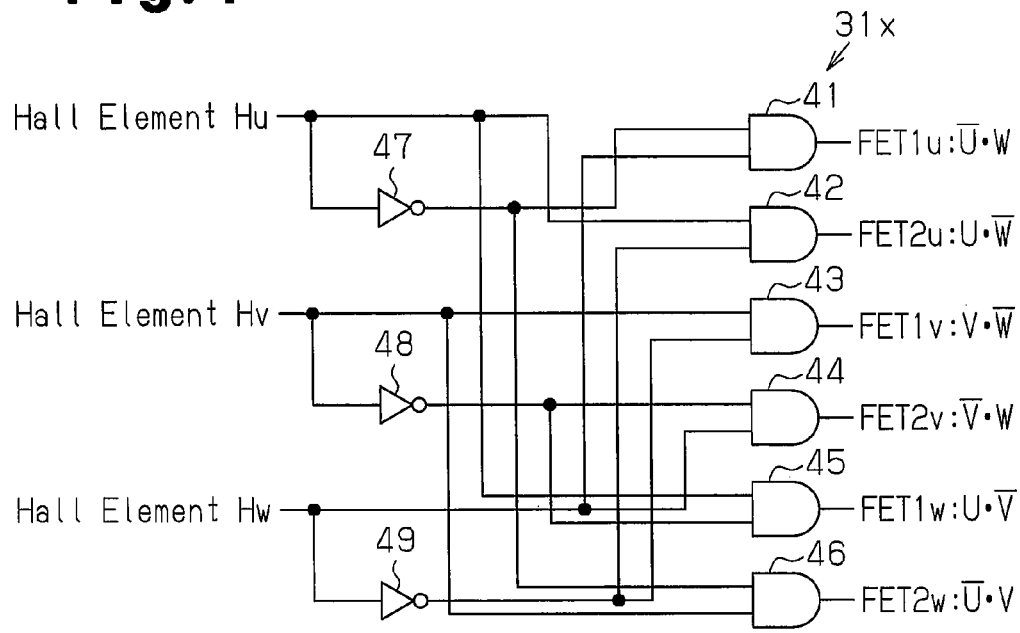
FIG. 4 is a diagram showing a logic gate circuit which generates the normal energizing timing of FIG. 2.

FIG. 4 shows the configuration of a logic gate circuit 31x, which generates a normal energizing timing as shown in FIG. 2, based on detection signals output from the hall elements Hu, Hv, and Hw, and FIG. 3 shows a truth table of the normal energizing timing.

The logic gate circuit 31x includes six AND circuits 41 to 46. The detection signal from the hall element Hu is input to one input terminal of the AND circuit 41 through an inverting circuit 47, and the detection signal from the hall element Hw is input to the other input terminal of the AND circuit 41. More specifically, an inverted detection signal from the hall element Hu and the detection signal from the hall element Hw are input to the AND circuit 41, and an output signal is output to the FET 1u.

The detection signal from the hall element Hu is input to one input terminal of the AND circuit 42, and the detection signal from the hall element Hw is input to the other input terminal of the AND circuit 42 through an inverting circuit 49. More specifically, the detection signal from the hall element Hu and the inverted detection signal from the hall element Hw are input to the AND circuit 42, and an output signal is output to the FET 2u.

The detection signal from the hall element Hv is input to one input terminal of the AND circuit 43, and the detection signal from the hall element Hw is input to the other input terminal of the AND circuit 43 through an inverting circuit 49. More specifically, the detection signal from the hall element Hv and the inverted detection signal from the hall element Hw are input to the AND circuit 43, and an output signal is output to the FET 1v.

The detection signal from the hall element Hv is input to one input terminal of the AND circuit 44 through an inverting circuit 48, and the detection signal from the hall element Hw is input to the other input terminal of the AND circuit 44. More specifically, the inverted detection signal from the hall element Hv and the detection signal from the hall element Hw are input to the AND circuit 44, and an output signal is output to the FET 2v.

The detection signal from the hall element Hu is input to one input terminal of the AND circuit 45, and the detection signal from the hall element Hv is input to the other input terminal of the AND circuit 45 through the inverting circuit 48. More specifically, the detection signal from the hall element Hu and the inverted detection signal from the hall element Hv are input to the AND circuit 45, and an output signal is output to the FET 1w.

The detection signal from the hall element Hu is input to one input terminal of the AND circuit 46 through the inverting circuit 47, and the detection signal from the hall element Hv is input to the other input terminal of the AND circuit 47. More specifically, the inverted detection signal from the hall element Hu and the detection signal from the hall element Hv are input to the AND circuit 46, and an output signal is output to the FET 2w. In this manner, the logic gate circuit 31x which generates a normal energizing timing based on the detection signals from the hall elements Hu, Hv, and Hw can be configured as described above.

Figures 6, 7:
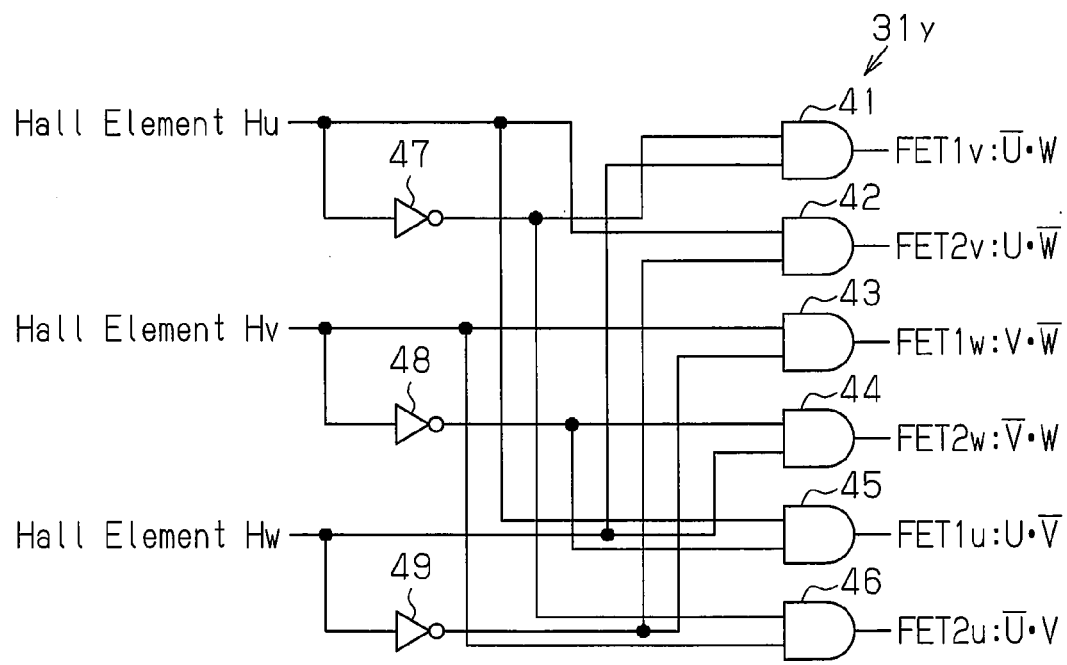
FIG. 6 is a truth table for the 120° advancing angle energizing timing of FIG. 5.
FIG. 7 is a diagram showing a logic gate circuit which generates the 120° advancing angle energizing timing of FIG. 5.

FIG. 7 shows the configuration of a logic gate circuit 31y, which generates a 120° advancing angle energizing timing based on the detection signals from the hall elements Hu, Hv, and Hw, and FIG. 6 shows a truth table of the 120° advancing angle energizing timing.

As apparent from FIG. 7, the logic gate circuit 31y has the same configuration as that of the logic gate circuit 31x. However, an output signal from the AND circuit 41 is output to the FET 1v, an output signal from the AND circuit 42 is output to the FET 2v, and an output signal from the AND circuit 43 is output to the FET 1w. Furthermore, an output signal from the AND circuit 44 is output to the FET 2w, an output signal from the AND circuit 45 is output to the FET 1u, and an output signal from the AND circuit 46 is output to the FET 2u. In this manner, the normal energizing timing and the 120° advancing angle energizing timing can be generated just by changing the output signals from the AND circuits 41 to 44 using the logic gate circuits 31x and 31y having the same configurations.

Accordingly, in the preferred embodiment, the drive timing generation unit 16 uses the logic gate circuit 31x (31y) as the basic timing generation unit 31 and is configured so that output signals from the AND circuits 41 to 46, which form the basic timing generation unit 31, are switched by the output switching unit 32. The output switching unit 32 has twelve AND circuits 51a, 51b to 56a, and 56b, and six OR circuits 61 to 66.

An output signal from the AND circuit 41 of the basic timing generation unit 31 is input to one input terminal of the AND circuit 51a of the output switching unit 32, and a switching signal output from the control unit 17 is input to the other input terminal of the AND circuit 51a. An output signal from the AND circuit 51a is input to one input terminal of the OR circuit 61. An output signal from the AND circuit 45 is input to one input terminal of the AND circuit 51b, and an inverted signal of a switching signal output from the control unit 17 is input to the other input terminal of the AND circuit 51b. An output signal from the AND circuit 51b is input to the other input terminal of the OR circuit 61 through the delay circuit 33. The OR circuit 61 outputs the output signal to the FET 1u.

An output signal from the AND circuit 42 is input to one input terminal of an AND circuit 52a, and a switching signal output from the control unit 17 is input to the other input terminal of the AND circuit 52a. An output signal from the AND circuit 52a is input to one input terminal of the OR circuit 62. Further, an output signal from the AND circuit 46 is input to one input terminal of an AND circuit 52b, and an inverted signal of the switching signal output from the control unit 17 is input to the other input terminal of the AND circuit 52b. An output signal from the AND circuit 52b is input to the other input terminal of the OR circuit 62 through the delay circuit 33. The OR circuit 62 outputs the output signal to the FET 2u.

An output signal from the AND circuit 43 is input to one input terminal of an AND circuit 53a, and a switching signal output from the control unit 17 is input to the other input terminal of the AND circuit 53a. An output signal from the AND circuit 53a is input to one input terminal of the OR circuit 63. An output signal from the AND circuit 41 is input to one input terminal of an AND circuit 53b, and an inverted signal of the switching signal output from the control unit 17 is input to the other input terminal of the AND circuit 53b. An output signal from the AND circuit 53b is input to the other input terminal of the OR circuit 63 through the delay circuit 33. The OR circuit 63 outputs the output signal to the FET 1v.

An output signal from the AND circuit 44 is input to one input terminal of an AND circuit 54a, and the switching signal output from the control unit 17 is input to the other input terminal of the AND circuit 54a. An output signal from the AND circuit 54a is input to one input terminal of the OR circuit 64. An output signal from the AND circuit 42 is input to one input terminal of an AND circuit 54b, and the inverted signal of the switching signal output from the control unit 17 is input to the other input terminal of the AND circuit 54b. An output signal from the AND circuit 54b is input to the other input terminal of the OR circuit 64 through the delay circuit 33. The OR circuit 64 outputs the output signal to the FET 2v.

An output signal from the AND circuit 45 is input to one input terminal of an AND circuit 55a, and the switching signal output from the control unit 17 is input to the other input terminal of the AND circuit 55a. An output signal from the AND circuit 55a is input to one input terminal of an OR circuit 65. An output signal from the AND circuit 43 is input to one input terminal of an AND circuit 55b, and the inverted signal of the switching signal output from the control unit 17 is input to the other input terminal of the AND circuit 55b. An output signal from the AND circuit 55b is input to the other input terminal of the OR circuit 65 through the delay circuit 33. The OR circuit 65 outputs the output signal to the FET 1w.

An output signal from the AND circuit 46 is input to one input terminal of the AND circuit 56a, and the switching signal output from the control unit 17 is input to the other input terminal of the AND circuit 56a. An output signal from the AND circuit 56a is input to one input terminal of the OR circuit 66. An output signal from the AND circuit 44 is input to one input terminal of the AND circuit 56b, and the inverted signal of the switching signal output from the control unit 17 is input to the other input terminal of the AND circuit 56b. An output signal from the AND circuit 56b is input to the other input terminal of the OR circuit 66 through the delay circuit 33. The OR circuit 66 outputs the output signal to the FET 2w.

The control unit 17, which outputs the switching signal to the drive timing generation unit 16 having the above configuration, switches the switching signal to an H level when a normal energizing timing is used and switches the switching signal to an L level when a 120° advancing angle energizing timing is used.

When the switching signal from the control unit 17 has an H level, in the drive timing generation unit 16, output signals from the AND circuits 41 to 46 of the basic timing generation unit 31 are output to latter stages through the AND circuits 51a to 56a. For this reason, the drive control signals (see FIG. 2) having the normal energizing timing are generated from the basic timings, which are generated from the detection signals of the hall elements Hu, Hv, and Hw, and then output to the gates of the FETs 1u, 2u, 1v, 2v, 1w, and 2w.

When the switching signal from the control unit 17 has an L level, in the drive timing generation unit 16, output signals from the AND circuits 41 to 46 of the basic timing generation unit 31 are output to latter stages through the AND circuits 51b to 56b. For this reason, the drive control signals (see FIG. 5) having the 120° advancing angle energizing timing are generated from the basic timing, which are generated from the detection signals from the hall elements Hu, Hv, and Hw. The drive control signals having the 120° advancing angle energizing timing are subjected to an advancing angle adjustment of 0° to 120° by a delay count operation of the delay circuit 33 and output to the gates of the FETs 1u, 2u, 1v, 2v, 1w, and 2w.

Rotation control performed by the control circuit 15 of the preferred embodiment will now be discussed with reference to the flowchart of FIG. 10A.

First, in step S1, based on an activation command signal from the air conditioner ECU, the brushless motor 10 is activated, and rotational drive of the brushless motor 10 is started. During the activation, the switching signal from the control unit 17 has an H level. In the drive timing generation unit 16 shown in FIG. 8, drive control signals of the normal energizing timing are generated from the detection signals of the hall elements Hu, Hv, and Hw, and the drive control signals are output to the FETs 1u, 2u, 1v, 2v, 1w, and 2w of the inverter circuit 12. The FETs 1u, 2u, 1v, 2v, 1w, and 2w are turned on or off based on the drive control signals of the normal energizing timing, and drive power is supplied to the brushless motor 10.

In step S2, through soft start control performed by the PWM generation unit 19 during activation, the duty ratio for the drive control signal of the normal energizing timing is gradually increased from a low level. This gradually increases the drive power supplied to the brushless motor 10 and gradually increases the rotation speed of the rotor 10a.

In step S3, it is determined whether or not the rotation speed of the rotor 10a has reached a predetermined rotation speed (for example, 800 [rpm]) based on the rotation speed of the rotor 10a obtained by the cycle counter in the control unit 17 that is operated based on the detection signals from the hall elements Hu, Hv, and Hw. More specifically, when the present normal energizing timing is switched to the 120° advancing angle energizing timing, it is determined whether the rotation speed of the rotor 10a is so slow that the delay counter of the delay circuit 33 is in an overflow section in which it overflows. When the rotation speed of the rotor 10a is lower than the predetermined rotation speed, steps S2 and S3 are repeated until the rotation speed becomes greater than or equal to the predetermined rotation speed. When the rotation speed of the rotor 10a is greater than or equal to the predetermined rotation speed, it is determined that normal operations may be performed with rotation control performed with the 120° advancing angle energizing timing without causing the delay counter to overflow. Thus, the processing proceeds to step S4.

In step S4, to prepare for switching to the 120° advancing angle energizing timing in step S6, a delay amount for the 120° advancing angle energizing timing is generated from the cycle counter within the control unit 17, which reflects the present rotation speed of the rotor 10a. Immediately after the switching from the normal energizing timing, a delay amount for the 120° advancing angle energizing timing is set to 120°, that is, the advancing angle amount is adjusted to 0°. Then, as the rotation speed increases, the delay amount is decreased, and the advancing angle amount is adjusted so as to gradually increase.

In step S5, to prepare for switching to the 120° advancing angle energizing timing in step S6, the delay amount generated in step S4 is set (reflected) as a count value of the delay counter of the delay circuit 33.

In step S6, a switching signal input to the drive timing generation unit 16 shown in FIG. 8 is switched from an H level to an L level. The FETs 1u, 2u, 1v, 2v, 1w, and 2w of the inverter circuit 12 are turned on and off based on the drive control signal of the advancing angle energizing timing, which is adjusted to be advanced in correspondence with the present rotation speed of the rotor 10a.

In step S7, the control unit 17 acquires motor information, which includes the rotation speed and drive current.

In step S8, the control unit 17 determines from the acquired motor information whether or not the present advancing angle is the necessary advancing angle, that is, whether or not the advancing angle amount conforms to the present rotation state. When it is determined that the advancing angle amount conforms to the present rotation state, it is determined in step S9 that changes will not be made to the advancing angle amount and the processing proceeds to step S11. When it is determined that the advancing angle amount does not conform to the present rotation state, the delay amount is changed in step S10.

In step S11, the delay amount in step S9 or S10 is reflected on the delay counter and adjusted to the advancing angle amount of the advancing angle energizing timing that conforms to the present rotation state. By repeating steps S7 to S11, the delay amounts in steps S9 and S10 are adjusted to advancing angle energizing timings that conform to the present rotation state.

Figure 9A:
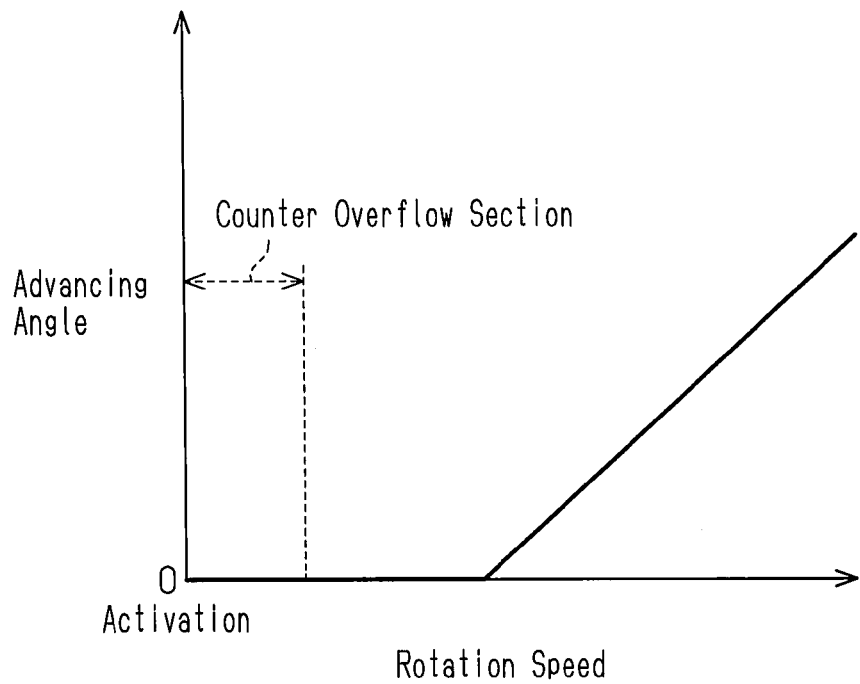
FIG. 9A is a diagram illustrating rotation speed control in the preferred embodiment.
Figure 9B:
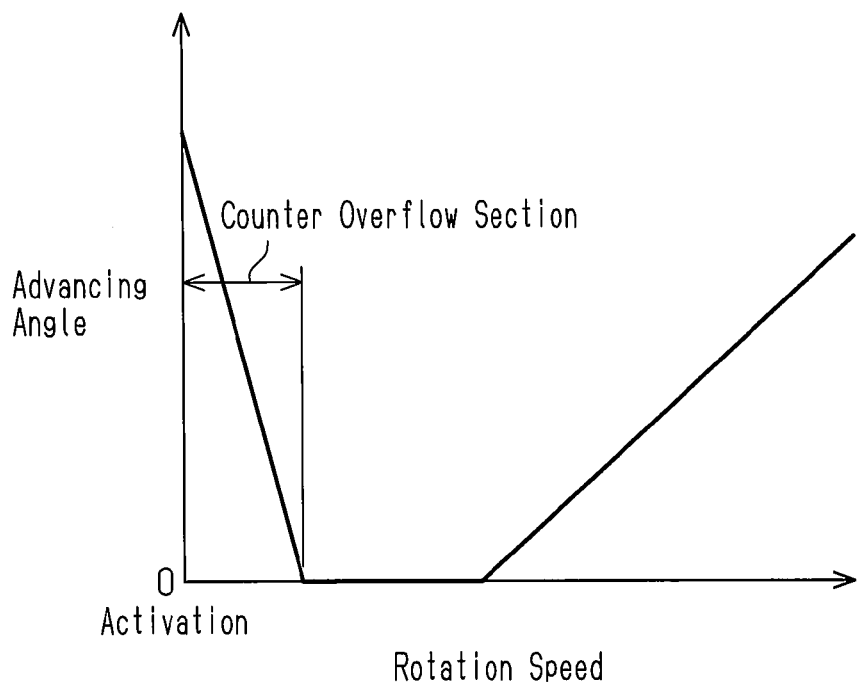
FIG. 9B is a diagram illustrating rotation speed control in the prior art.

In the preferred embodiment in which rotation control is performed in accordance with steps S1 to S11, as shown in FIG. 9A, rotation control with the normal energizing timing (zero advancing angle) is performed during the period immediately after activation in which the speed is extremely low. Then, after the rotation speed increases to a rotation speed at which the delay counter of the advancing angle energizing timing does not overflow, the rotation control is switched to rotation control with the advancing angle energizing timing. As shown in FIG. 9B, in the prior art, the rotation control with an advancing angle energizing timing is always performed. Thus, the delay counter overflows during the period immediately after activation in which the speed is extremely low, and the advancing angle energizing timing cannot be accurately delayed. This lowers the motor efficiency and increases noise and vibration since energizing cannot be performed at an optimum timing. However, the preferred embodiment prevents such a situation from occurring. Accordingly, in the preferred embodiment, rotational drive of the brushless motor 10 is stabilized even from the period immediately after activation in which the speed is extremely low.

The advantages of the preferred embodiment will now be discussed.

(1) In the preferred embodiment, the drive timing generation unit 16 generates a normal energizing timing and a 120° advancing angle energizing timing based on rotational positions (detection signals from the hall elements Hu, Hv, and Hw) of the rotor 10a. Further, the control unit 17 generates a delay amount for the 120° advancing angle energizing timing in correspondence with the rotation speed of the rotor 10a. When the rotation speed of the rotor 10a is lower than the predetermined rotation speed, the control unit 17 performs rotation control with the normal energizing timing. When the rotation speed of the rotor 10a is greater than or equal to the predetermined rotation speed, the control unit 17 performs rotation control with the advancing angle energizing timing, which is obtained after reflection of the delay amount. More specifically, in the period immediately after activation in which the speed is extremely low, angle advancing control is not suitable since it operates the delay counter based on the delay amount corresponding to the rotation speed of the rotor 10a to adjust the advancing angle amount for the advancing angle energizing timing. Thus, in a low rotation speed state in which the rotation speed of the rotor 10a is lower than the predetermined rotation speed, the normal energizing timing, which can be easily generated based on the rotational position of the rotor 10a, is selected and rotation control is performed with the normal energizing timing. Such simple control prevents the motor efficiency from decreasing and noise and vibration from increasing. Further, the rotational drive of the brushless motor 10 is stabilized even from the period immediately after activation in which the rotation speed is extremely low.

(2) In the preferred embodiment, the drive timing generation unit 16 includes the basic timing generation unit 31 and the output switching unit 32. The basic timing generation unit 31 generates basic timings determined by rotational positions of the rotor 10a. The output switching unit 32 is controlled by a control switching unit to selectively generate the normal energizing timing and the advancing angle energizing timing from the basic timings. More specifically, in the drive timing generation unit 16, the basic timing generation unit 31 generates common basic timings, and the normal and advancing angle energizing timings are selectively generated based on the common basic timings. The basic timing generation unit 31 and the output switching unit 32 form the drive timing generation unit 16 with a simple configuration.

(3) In the preferred embodiment, among the advancing angle energizing timings in intervals of 60°, the drive timing generation unit 16 generates a 120° advancing angle energizing timing, which is greater than the necessary advancing angle amount of 80° of the brushless motor 10 and is the minimum angle. The energizing of the three-phase stator coils 10u, 10v, and 10w is performed at 120° intervals in each phase, and the detection signals of the hall elements Hu, Hv, and Hw are output for each phase in 120° intervals. Thus, an advancing angle energizing timing having an advancing angle amount of 120° can easily be generated from the detection signals. Furthermore, since an advancing angle energizing timing having an advancing angle amount that is larger than the necessary advancing angle amount of 80° for the brushless motor 10 and having the minimum angle is used. This prevents the delay amount generated when adjusting the advancing angle from increasing. Thus, the delay counter, which reflects the delay amount, may be miniaturized. This contributes to reduction in circuit scale of the control circuit 15. Further, errors in energizing timings would increase when the delay amount increases. However, since the delay amount is minimized, angle advancing control may be performed with high accuracy.

It should be apparent to those skilled in the art that the present invention may be embodied in many other specific forms without departing from the spirit or scope of the invention. Particularly, it should be understood that the present invention may be embodied in the following forms.

In the preferred embodiment, although the switching from the normal energizing timing to the advancing angle energizing timing is not specified in step S6, the energizing of the motor 10 (coils 10u, 10v, and 10w) may be temporarily stopped to perform the switching.

More specifically, as shown in FIG. 10B, prior to step S6 in which switching to the advancing angle energizing timing is performed, step S12 may be inserted to temporarily deactivate the brushless motor 10. Then, after step S6, step S13 may be inserted to reactivate the brushless motor 10. When the normal energizing timing is switched to the advancing angle energizing timing during activation of the brushless motor 10, the two energizing timings may become mixed and cause an erroneous operation during the rotation control. Therefore, by temporarily deactivating the brushless motor 10 to perform the switching, erroneous operations are prevented.

In the preferred embodiment, the drive timing generation unit 16, which serves as the normal timing generation unit and the advancing angle timing generation unit, is configured to generate a normal energizing timing and a 120° advancing angle energizing timing. However, the advancing angle amount of the advancing angle energizing timing may be changed to any value as long as it is greater than the necessary advancing angle amount (varies in accordance with the motor configuration). In this case, it is desirable that advancing angle energizing timings having 60° intervals (60°, 180°, 240°, and 300°) be used.

Figures 11, 12:
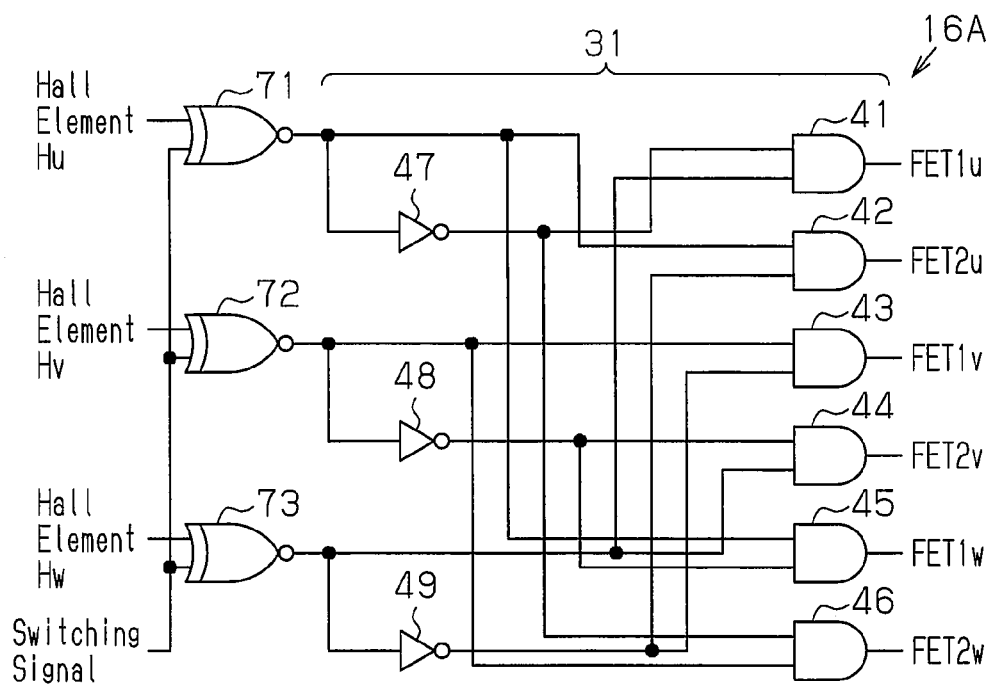
FIG. 11 is a truth table for a 180° advancing angle energizing timing.
FIG. 12 is a diagram illustrating a logic gate circuit of another example which generates a normal energizing timing and a 180° advancing angle energizing timing.

For example, as shown in FIG. 12, a drive timing generation unit 16A may be configured to generate a normal energizing timing and a 180° advancing angle energizing timing. FIG. 11 is a truth table for the 180° advancing angle energizing timing.

The drive timing generation unit 16A includes EX-NOR circuits 71 to 73. The EX-NOR circuits 71 to 73 each have one terminal for respectively receiving detection signals from the hall elements Hu, Hv, and Hw in the basic timing generation unit 31 (the logic gate circuit 31x in FIG. 4) and another terminal for respectively receiving switching signals. When the switching signal has an L level, the detection signals from the hall elements Hu, Hv, and Hw are directly input to the basic timing generation unit 31, and output signals of the normal energizing timing are output from the AND circuits 41 to 46, which serve as output circuits of the basic timing generation unit 31. When the switching signal shifts to an H level, inverted signals of the detection signals from the hall elements Hu, Hv, and Hw are input to the basic timing generation unit 31, and output signals of the 180° advancing angle energizing timing are output from the AND circuits 41 to 46, which serve as the output circuits of the basic timing generation unit 31. Then, ON/OFF-control of the FETs 1u, 2u, 1v, 2v, 1w, and 2w is performed by the output signals of the normal energizing timing and the 180° advancing angle energizing timing.

The drive timing generation unit 16A having such a configuration may be used in the brushless motor 10 of the preferred embodiment having the necessary advancing angle amount of 80°. The drive timing generation unit 16A is configured with less gates. This contributes reducing the circuit scale of the control circuit 15.

A logic gate circuit that generates advancing angle energizing timings having advancing angle amounts other than 120° and 180°, such as 60°, 240°, and 300°, may be easily configured by using the basic timing generation unit 31 and applying a circuit formed by any combination of logic gate circuits, such as AND circuits, OR circuits, and EX-NOR circuits, as an input/output circuit for advancing angle energizing timings.

In the preferred embodiment, the three hall elements Hu, Hv, and Hw are used as rotation sensors. However, the quantity of sensors is not limited to three, and, for example, one or two sensors may be used. Further, instead of hall elements, magnetic sensors or other types of sensors may be used as the rotation sensor.

In the preferred embodiment, the controller 11 is applied to the brushless motor 10, which is used as a blower motor for a vehicle air conditioner. However, the controller 11 may be applied to a brushless motor used for other purposes.

The present examples and embodiments are to be considered as illustrative and not restrictive, and the invention is not to be limited to the details given herein, but may be modified within the scope and equivalence of the appended claims.

What is claimed is:

1. A brushless motor controller that performs rotation control for a brushless motor by detecting a rotational position and a rotation speed of a rotor based on a detection signal from a rotation sensor and determining an energizing timing of a three-phase stator coil based on the detected rotational position and rotation speed of the rotor, the brushless motor controller comprising:
   a normal timing generation unit which generates a normal energizing timing determined by the rotational position of the rotor;
   an advancing angle timing generation unit which generates an advancing angle energizing timing determined by the rotational position of the rotor and advanced by a predetermined amount from the normal energizing timing, generates a delay amount that changes in correspondence with the rotation speed of the rotor, and generates a final advancing angle energizing timing delayed by the delay amount from the advancing angle energizing timing; and
   a control switching unit which switches rotation control of the motor between a first rotation control executed when the rotation speed of the rotor is less than a predetermined value and a second rotation control executed when the rotation speed of the rotor is greater than or equal to the predetermined value, wherein the motor is controlled in accordance with the normal energizing timing in the first rotation control, and the motor is controlled in accordance with the final advancing angle energizing timing in the second rotation control.

2. The brushless motor controller according to claim 1, wherein the control switching unit temporarily deactivates the motor when switching from the first rotation control to the second rotation control.

3. The brushless motor controller according to claim 1, wherein the normal timing generation unit and the advancing angle timing generation unit include:
   a basic timing generation unit which generates a basic timing determined by the rotational position of the rotor; and an output switching unit controlled by the control switching unit to selectively generate the normal energizing timing and the advancing angle energizing timing from the basic timing.

4. The brushless motor controller according to claim 1, wherein the advancing angle timing generation unit is configured to generate among the advancing angle energizing timings in intervals of 60°, an advancing angle energizing timing that is greater than a necessary advancing angle amount of the motor and is a minimum angle.

5. The brushless motor controller of claim 1, wherein the controller is formed integrally with the motor.

6. A method for controlling a brushless motor that performs rotation control for the brushless motor by detecting a rotational position and a rotation speed of a rotor based on a detection signal from a rotation sensor and determining an energizing timing of a three-phase stator coil based on the detected rotational position and rotation speed of the rotor, the method comprising:

generating a normal energizing timing determined by a rotational position of the rotor;

generating an advancing angle energizing timing determined by the rotational position of the rotor and advanced by a predetermined amount from the normal energizing timing;

generating a delay amount related to the advancing angle energizing timing that changes in correspondence with the rotation speed of the rotor;

generating a final advancing angle energizing timing delayed by the delay amount from the advancing angle energizing timing;

controlling the motor in accordance with the normal energizing timing when the rotation speed of the rotor is less than a predetermined value; and controlling the motor in accordance with the final advancing angle energizing timing when the rotation speed of the rotor is greater than or equal to the predetermined value.

* * * * *

UNITED STATES PATENT AND TRADEMARK OFFICE
CERTIFICATE OF CORRECTION

| | | |
|---|---|---|
| PATENT NO. | : 8,040,090 B2 | Page 1 of 1 |
| APPLICATION NO. | : 12/429705 | |
| DATED | : October 18, 2011 | |
| INVENTOR(S) | : Takayuki Kitagawa | |

It is certified that error appears in the above-identified patent and that said Letters Patent is hereby corrected as shown below:

On the Title Page at item number (75), "Takayuji" should be -- Takayuki --.

Signed and Sealed this
Thirty-first Day of January, 2012

David J. Kappos
*Director of the United States Patent and Trademark Office*